(12) United States Patent
Benvenuto et al.

(10) Patent No.: US 7,740,307 B2
(45) Date of Patent: Jun. 22, 2010

(54) MOTOR VEHICLE COMPONENT AND METHODS FOR ITS MANUFACTURE

(76) Inventors: Guido Benvenuto, 8870 Broderick Road, Lasalle, N9A 6Z6 (CA); Robert DeSantis, 2065 Suzanne St., Lasalle, Ont. N9H-1R6 (CA); A. Tony Facconio, 350 Forest Hill ert, Amherstburg, Ont. N9V 9c2 (CA); Patrick Martyn, 1693 Huffman Rd, Harrow, Ont N90 1G0 (CA)

( * ) Notice: Subject to any disclaimer, the term of this patent is extended or adjusted under 35 U.S.C. 154(b) by 0 days.

(21) Appl. No.: 12/183,476

(22) Filed: Jul. 31, 2008

(65) Prior Publication Data

US 2009/0026805 A1   Jan. 29, 2009

Related U.S. Application Data

(63) Continuation-in-part of application No. 11/762,971, filed on Jun. 14, 2007, now abandoned.

(60) Provisional application No. 60/813,742, filed on Jun. 14, 2006.

(51) Int. Cl.
B62D 25/08 (2006.01)
(52) U.S. Cl. ...................................................... 296/192
(58) Field of Classification Search ................. 296/192, 296/194, 203.02
See application file for complete search history.

(56) References Cited

U.S. PATENT DOCUMENTS

2003/0107243 A1 * 6/2003 Hayashi ....................... 296/192
2006/0226681 A1 * 10/2006 Kelly ........................... 296/192

* cited by examiner

*Primary Examiner*—Joseph D Pape
(74) *Attorney, Agent, or Firm*—Gifford, Krass, Sprinkle, Anderson & Citkowski, P.C.

(57) ABSTRACT

A unitary cowl top ventilator component has a body of rigid, polymeric material which defines a structural member of the component. A first body of polymeric material is fusion bonded to a first portion of the structural member to provide a windshield seal, and a second body of polymeric material is fusion bonded to a second portion of the structural member to provide a hood seal. In some instances the hood seal is a bulb-type seal, and in other instances it is a blade seal.

15 Claims, 6 Drawing Sheets

MOTOR VEHICLE COMPONENT AND METHODS FOR ITS MANUFACTURE

CROSS-REFERENCE TO RELATED APPLICATIONS

This application is a continuation-in-part of U.S. patent application Ser. No. 11/762,971 filed Jun. 14, 2007, which claims priority of U.S. Provisional Patent Application Ser. No. 60/813,742 filed Jun. 14, 2006, entitled "Motor Vehicle Component and Method."

FIELD OF THE INVENTION

This invention relates generally to nonmetallic components of motor vehicles and to methods for their manufacture. More specifically, the invention relates to injection molded components of motor vehicles, comprising rigid, structural polymeric members having integral seals, formed from an elastomeric polymer, bonded thereto. Most specifically, the invention relates to a cowl top ventilator component for a motor vehicle and to methods for its manufacture.

BACKGROUND OF THE INVENTION

The cowl top ventilator is a component of a motor vehicle which operates to bridge the space between the windshield, hood and other body components of the motor vehicle while allowing for entry of outside air into the heating, ventilation and air conditioning system of the vehicle. The cowl must further operate to prevent exhaust and other vapors from the engine compartment from entering the passenger cabin of the motor vehicle. The cowl component must further operate to exclude water from the passenger cabin and from the engine compartment of the vehicle. In the prior art, such cowl top ventilator assemblies were typically multicomponent structures fabricated from a rigid structural material such as metal or a high strength polymer, and further incorporating a plurality of separate sealing gaskets. The multipart nature of these assemblies complicates the inventory, handling and installation of the cowl top ventilators, and can also lead to problems with the quality of the water or gas-tight seal provided thereby. As a consequence, such assemblies are costly and difficult to use.

As will be explained in detail hereinbelow, the present invention provides for a unitary cowl top ventilator component which is fabricated from a high strength structural polymer and includes a series of integral seals, comprised of a polymeric material, molded thereonto. The components of the present invention are preferably manufactured by a multiple shot injection molding process which provides for a tight, fusion bond between the structural material and the elastomeric sealing material. As a consequence, high quality, integral, permanently bonded seals are provided.

BRIEF DESCRIPTION OF THE INVENTION

Disclosed herein is a unitary cowl top ventilator component for a motor vehicle. The component includes a body of a rigid polymeric material which defines a structural member of the component. The cowl further includes a first body of an elastomeric polymer bonded to a first portion of the structural member. The first body of elastomeric material defines a first sealing member which is configured to engage a windshield of a motor vehicle. The cowl further includes a second body of an elastomeric polymer bonded to a second portion of the structural member. The second body of elastomeric material defines a second sealing member which is configured to engage a hood of a motor vehicle. In some instances, the cowl may further include a portion which is configured to support a seal which engages a plenum of a motor vehicle. This seal may be a body of an elastomeric polymer integrally molded onto the cowl, or it may comprise a separately affixed body of material such as a body of a foamed polymer.

The seal which engages the windshield may comprise a flange which engages a face of the windshield. It may additionally, or alternatively, comprise a body which engages an edge of the windshield. The seal which engages the hood may comprise a bulb, a bead, a blade, a ridge, or any other such feature. In one specific instance, the seal is a hybrid seal which comprises an elastomeric blade which engages the hood, and operates in conjunction with a projecting blade portion of the structural member which underlies the elastomeric body and provides it with stiffness and resiliency. The cowl may further include features such as attachment hooks, brackets, and the like integrally molded thereonto or affixed by adhesive or fusion bonds. The cowl may be further configured to include openings having seals which allow for the pivotal motion of a portion of a windshield wiper assembly.

In particular instances, the elastomeric material comprises natural rubbers, synthetic rubbers, elastomeric copolymers and the like taken either singly or in combination. The rigid polymer comprising the structural member may be a structural polymeric material such as nylon, ABS, polypropylene, TPO, ASA PC, and combinations thereof, and this polymer may be reinforced with a particulate or fibrous material.

In specific instances, the cowl of the present invention is manufactured by an injection molding process, and in specific instances, this injection molding process is a multiple shot injection molding process which, in some instances, may be implemented utilizing a retracting blade, a sliding member, or similar structures.

DETAILED DESCRIPTION OF THE INVENTION

As mentioned above, cowl top ventilator assemblies in accord with the present invention are fabricated from a combination of rigid and elastomeric polymeric materials, through the use of a multiple injection molding process. This process produces unitary bodies having rigid, structural and elastomeric sealing portions configured to provide a cowl member for a motor vehicle. The cowls made in accord with the present invention may have various configurations depending upon the configurations of the vehicles in which they are being incorporated. As such, it is to be understood that this disclosure utilizes some specific embodiments of the invention to illustrate the general purposes thereof, and the invention may be implemented in otherwise configured embodiments and/or may utilize processes and materials other than those specifically shown herein.

Figure 1:
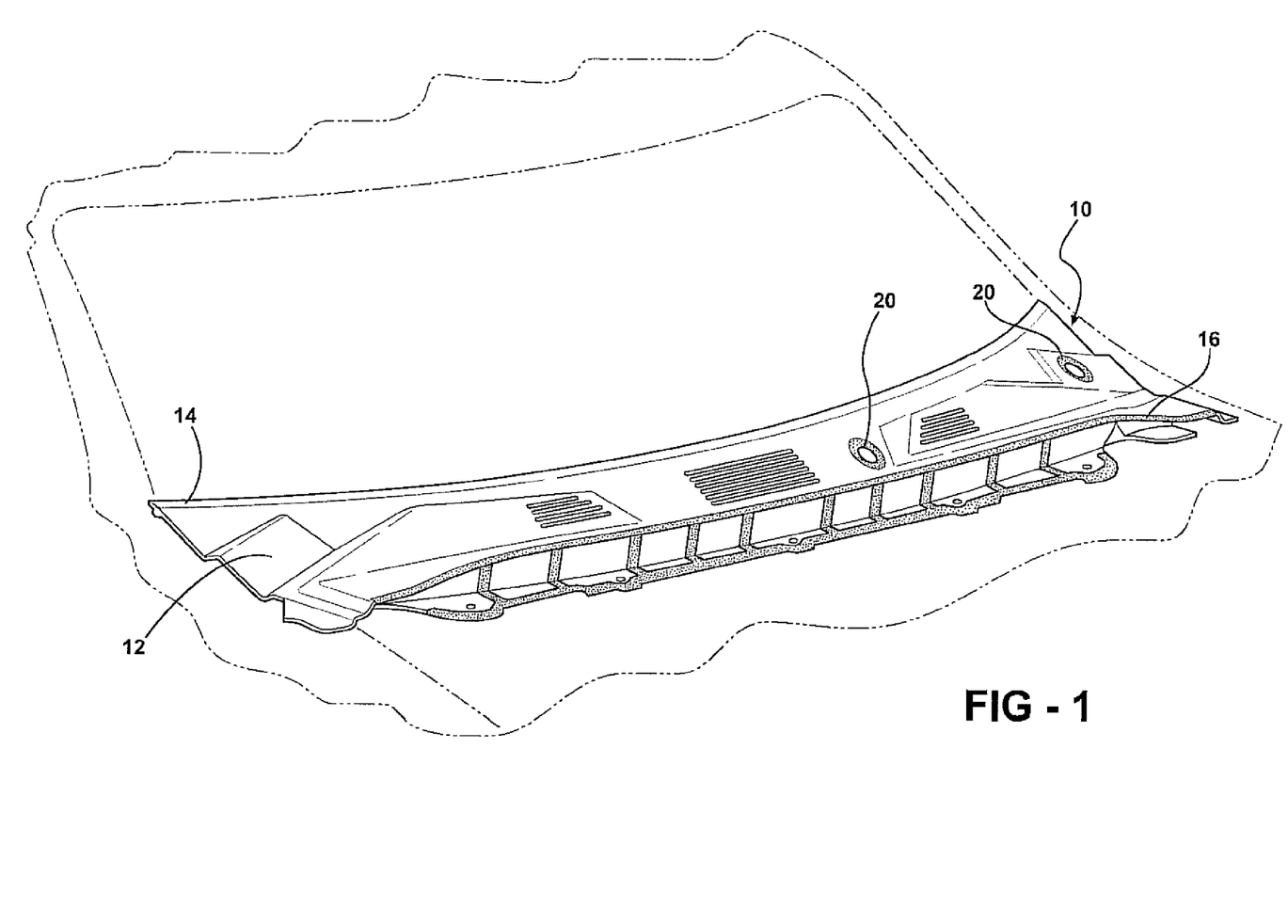
FIG. 1 is a perspective view of one embodiment of cowl structured in accord with the present invention.

Referring now to FIG. 1, there is shown one specific embodiment of a cowl top ventilator assembly 10 in accord with the present invention. The cowl 10 includes a body or structural portion 12 which is fabricated from a rigid polymeric material, as will be described hereinbelow. The cowl 10 includes a first elastomeric portion, also termed a window seal 14, which extends along a first edge thereof. As will be explained hereinbelow, this window seal (also termed a lace) is configured to engage the front windshield of a motor vehicle (a windshield portion of which is shown in phantom outline) and form a water-resistant seal thereto. Projecting from an opposite edge is a hood seal 16. This seal is also fabricated to include an elastomeric portion, and when the cowl 10 is installed in a motor vehicle, this hood seal 16 engages the vehicle's hood forming an environmental seal for the engine compartment. In the illustrated embodiment a projecting portion of the cowl 10 disposed beneath the hood seal 16 is configured to seal the cowl 10 to a plenum of the motor vehicle. The plenum seal may be comprised of a body of elastomeric material integrally molded onto the cowl 10; but, in other instances, the seal may be a separately applied piece of material such as a foam strip. In the illustrated embodiment, the cowl 10 further includes pivot seals 20 for engaging a windshield wiper mechanism of the motor vehicle. These pivot seals 20 are configured as openings formed in the body 12 of the cowl 10, and further include an elastomeric sealing gasket disposed about the circumference of the opening. The windshield wiper pivot seals 20 are optional elements in the cowl, and may be omitted or otherwise disposed. As will be explained in further detail, the cowl may include yet other features, such as attachment clips and the like, and these features may be integrally molded thereonto.

Figure 2:
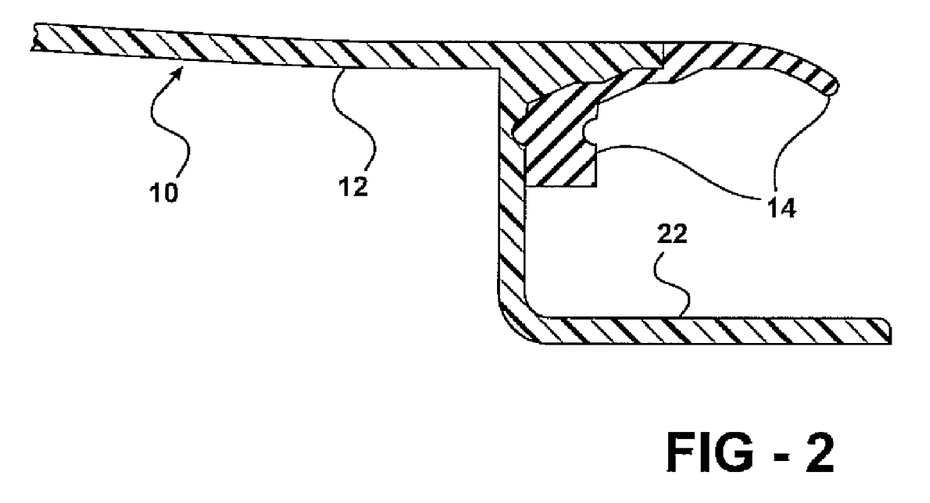
FIG. 2 is a cross-sectional view of a windshield-engaging portion of a cowl.

Referring now to FIG. 2, there is shown a cross-sectional view of a portion of the windshield-engaging section of a particular cowl top ventilator component of the present invention. The illustrated portion of the cowl 10 is comprised of a structural body member 12, typically fabricated from a high strength polymer such as nylon, ABS, polypropylene, ASA, PC, other thermoplastic polyolefins (TPO) or the like. This polymer may, as is known in the art, be reinforced with a material such as glass fiber, carbon fiber, mineral material, metallic material or the like, so as to increase its strength. As shown in FIG. 2, the structural member 12 includes a channel portion 22 which is configured to engage the windshield of a motor vehicle. Integral with, and bonded to, the channel portion 22 is a body of elastomeric polymer 14 which forms a sealing member which engages a windshield (not shown). A first portion of the elastomeric body 14 engages an edge of the windshield, and a second portion forms a front, flange-like seal which contacts the face of the windshield, proximate at least one edge thereof. As shown herein, the two sealing portions are contiguous, although it is to be understood that they may be separate bodies. The thermoplastic elastomeric material may comprise natural rubbers, synthetic rubbers, copolymers, as well as any other natural or synthetic material providing the requisite combination of strength and resiliency.

Figure 3:
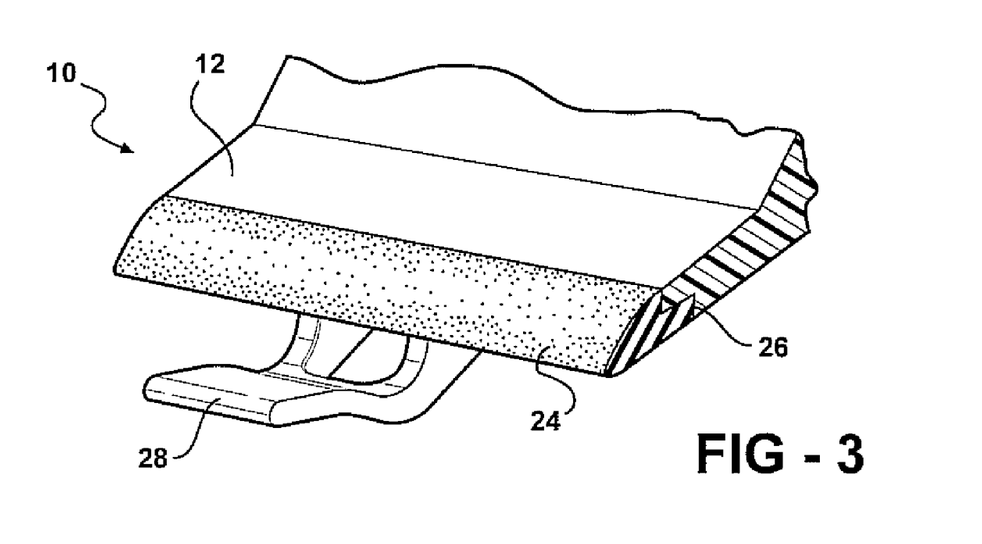
FIG. 3 is a perspective view, in partial cross section, of a portion of the window-engaging portion of a cowl member.

The FIG. 2 embodiment shows an elastomeric window seal that contacts an edge and front surface of the windshield; in other embodiments, this seal may be otherwise configured. Referring now to FIG. 3, there is shown a perspective view, in partial cross section, of a portion of another cowl assembly 10 in which the windshield-engaging portion is configured so that an elastomeric body establishes only face contact with the windshield. Specifically, the embodiment of FIG. 3 includes a structural member 12, fabricated from a rigid polymeric material as described hereinabove. Bonded to an edge of the structural member 12 is a blade-like elastomeric body 24, as described above. The elastomeric body 24 is configured to provide a seal to the face of a windshield. As is seen in the cross-sectional portion of the FIG. 3 illustration, the interface 26 between the edges of the structural member 12 and the elastomeric body 24 is a step interface. This type of interface enhances the contact area, and hence the adhesion between the two bodies. As further illustrated, the FIG. 3 embodiment includes an attachment hook 28 which is integrally molded with the structural body 12. Other attachment features such as channels, tabs, and the like may be likewise included. In some instances, attachment members may be formed to include a living hinge which joins them to the remainder of the structural member 12. In yet other instances, attachment members may comprise separately affixed bodies joined in the structural member by means including, but not limited to, adhesive, adhesion bonding, mechanical connectors and the like. In view of FIGS. 2 and 3, it is to be understood that yet other configurations of windshield engagement portions may be implemented. For example, some embodiments may eliminate front face contact with the windshield and rely solely upon edge contact. All such embodiments are within the scope of this invention.

Figure 4:
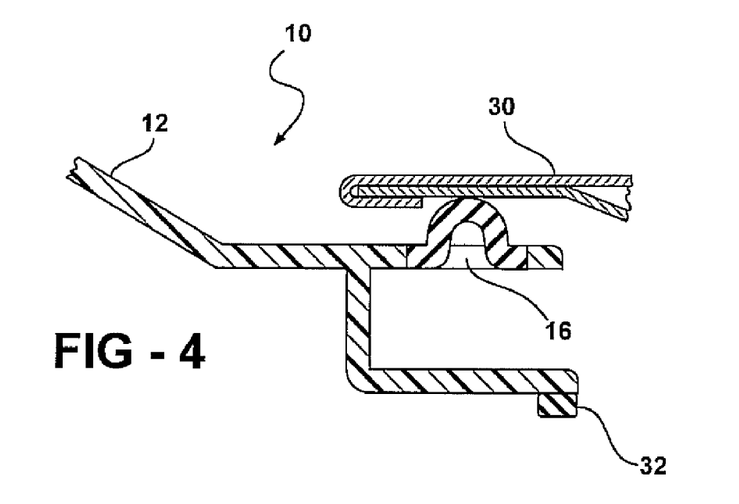
FIG. 4 is a cross-sectional view of a portion of a cowl member shown as being in engagement with a portion of a hood of a motor vehicle.

Referring now to FIG. 4, there is shown a cross-sectional view of a portion of a cowl 10 which is configured to engage the hood, 30, of a motor vehicle. Shown in the FIG. 4 embodiment is a structural portion 12 as previously described which includes an integrally molded hood seal 16 fabricated from an elastomeric material. In the illustrated embodiment, the hood seal 16 is configured as a hollow, elastomeric bead, also referred to as a bulb seal, which engages, and is compressed by, a portion of the hood 30. In other embodiments, the hood seal may be otherwise configured. For example, the hood seal may comprise a projecting, elastomeric, blade, a solid bead, a series of blades, beads or other such features, as well as variations thereof.

In the illustrated embodiment, the structural body 12 is configured to include a portion which projects beneath the hood seal 16. This portion is configured to engage the plenum of the motor vehicle and to provide an environmental seal between the engine compartment and passenger compartment. In that regard, the plenum-engaging portion may include a further sealing member 32. This seal 32 may, in some instances, be an integrally formed body of elastomeric material as described above, and in that regard, may be variously configured. In other instances, the plenum seal may be provided by a body of foamed polymer adhesively affixed to the plenum-contacting portion of the structural member 12. It should be noted that the illustration of FIG. 4 is intended only to show the general principles of the invention. Depending upon particular configurations of the motor vehicle, the relative size, placement and direction, orientation of the various components will differ.

Figure 5:
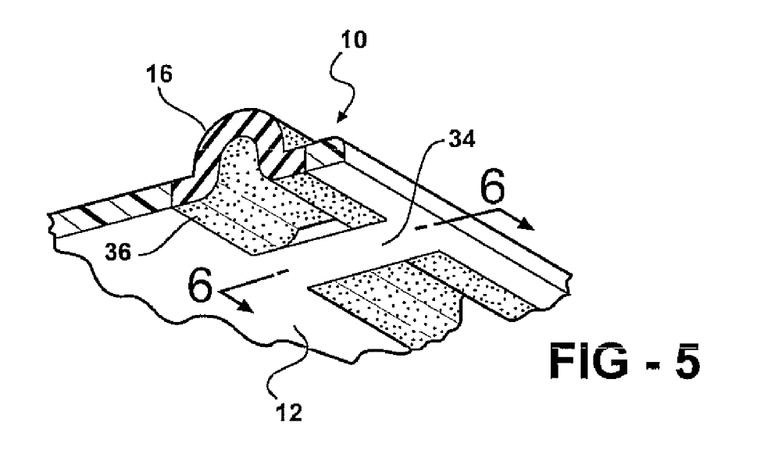
FIG. 5 is an enlarged, perspective view, in partial cross section, of a portion of the hood seal of the FIG. 4 embodiment.

Referring now to FIG. 5, there is shown an enlarged, partially cross-sectional, perspective view of a hood seal 16 and the associated portion of the structural member 12 of the cowl 10. As illustrated in FIG. 5, the structural member 12 includes a plurality of crossbar sections 34 which are disposed so as to bridge portions of the slot 36 into which the elastomeric material of the hood seal 16 is molded. These crossbar portions 34 give additional strength and rigidity to the cowl, and further serve to strengthen the bead 16 so as to prevent undue collapse or set during its service life.

Figure 6:
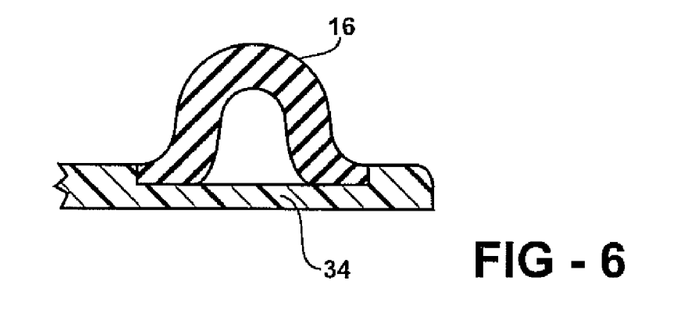
FIG. 6 is a cross-sectional view of the seal of FIG. 5 taken along line A-A.

Referring now to FIG. 6, there is a shown a cross-sectional view of the segment of the cowl 10 of FIG. 5, taken along line 6-6. As will be seen in FIG. 6, the crossbar portion 34 of the structural body bridges the two portions of the body 12, but does not project into the seal portion 16. This structure can be achieved by the use of a finger type lifter in the molding apparatus. A seal configured as per FIGS. 4-6, also termed a "bulb seal" combines rigidity and resiliency and is operable to provide a good sealing action under a variety of environmental conditions. In other embodiments, the structural member may be configured so that the entire body of the hood seal is backed by solid material. In yet other instances, reinforcement of the hood seal may be provided by an insert of yet a different material such as a metallic body, another polymeric body, or the like. Also, as noted above, the hood seal may be fabricated as a solid body of elastomeric material.

Figure 7:
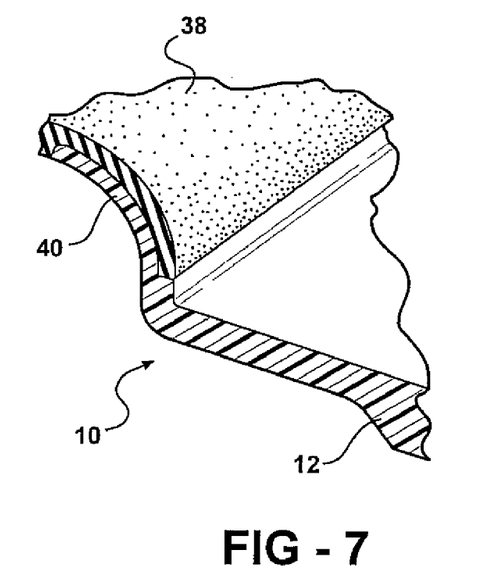
FIG. 7 is a perspective view, in partial cross section, of a hybrid hood seal in accord with the present invention.

Referring now to FIG. 7, there is shown yet another embodiment of a hood seal design referred to as a "hybrid" hood seal. The FIG. 7 embodiment is a partial perspective view, in cross section, of a cowl 10 showing a hybrid hood seal configuration in which sealing of the hood is accomplished by a body of elastomeric material 38 which is configured as a blade-like member. Underlying a major portion of the elastomeric material is a blade-like extension portion 40 of the material comprising the structural member 12. In the operation of this seal, elastomeric material 38 provides a tight environmental seal against the hood, while the extension portion 40 stiffens and supports the elastomeric material 38 while allowing for some flexibility. This combination of materials and properties in this hybrid seal prevents the elastomeric body from taking a set during its service life and provides for the long-term reliability of the hood seal.

Figure 8:
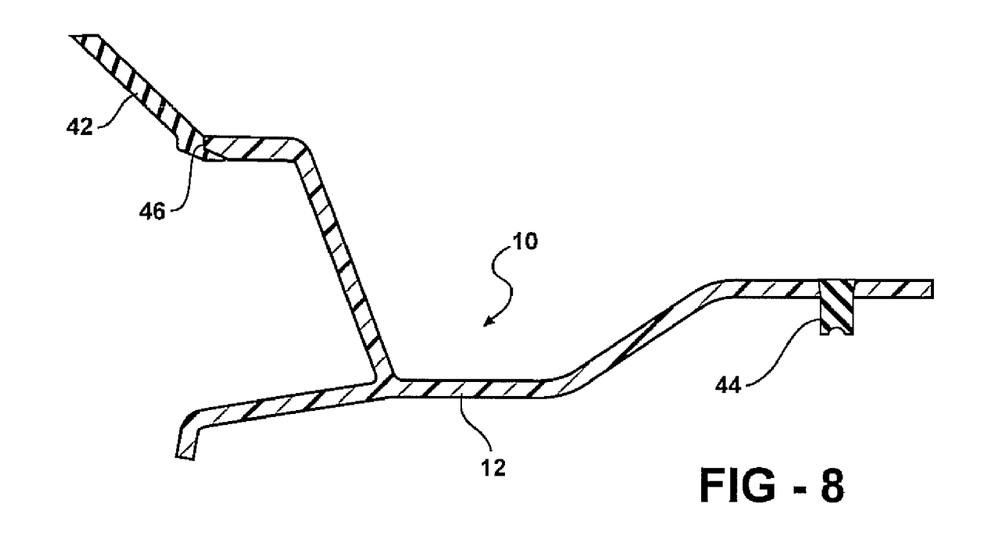
FIG. 8 is a cross-sectional view of a portion of a cowl showing the hood seal and plenum seal thereof.

Referring now to FIG. 8, there is shown a cross-sectional view of a portion of a cowl 10 which portion includes a hood seal 42 and a plenum seal 44. As shown in FIG. 8, the cowl 10 has a structural body 12 which includes a blade-like hood seal 42 thereupon. This seal 42 is bonded to the structural body 12 via a step joint 46 which increases the contact thereof between the two materials. In other embodiments, this joint may be variously configured. The FIG. 8 embodiment further includes a plenum seal 44 which is comprised of an elastomeric material integrally molded onto the structural body 12.

Cowls in accord with the present invention may be yet otherwise configured. As discussed above, the cowls may include further features such as windshield wiper seals, attachment hooks or other mounting hardware, and the like. In the typical assembly of motor vehicles, cowls are used in combination with end boots which operate to join the cowl to the remainder of the vehicular structure. In accord with the present invention, such end boot members may be formed as integral portions of the cowl during the molding process used for cowl fabrication. Alternatively, the end boots may be formed as separate members, and in that regard, the cowls of the present invention may include coupling features such as latches, hooks, mounting hardware, and/or elastomeric sealing members.

Various processes may be used to fabricate the components of the present invention. Injection molding is one particular method which may be employed, and multiple shot injection molding is a specific type of injection molding which may be used with advantage in the present invention. In such processes, different types of molding material may be simultaneously or sequentially injected into a mold to fabricate unitary articles having different types of material fusion bonded to one another. Within the context of this disclosure, fusion bonding shall refer to bonds formed by contacting bodies of material together when at least one of those materials is in a molten state.

Figure 9:
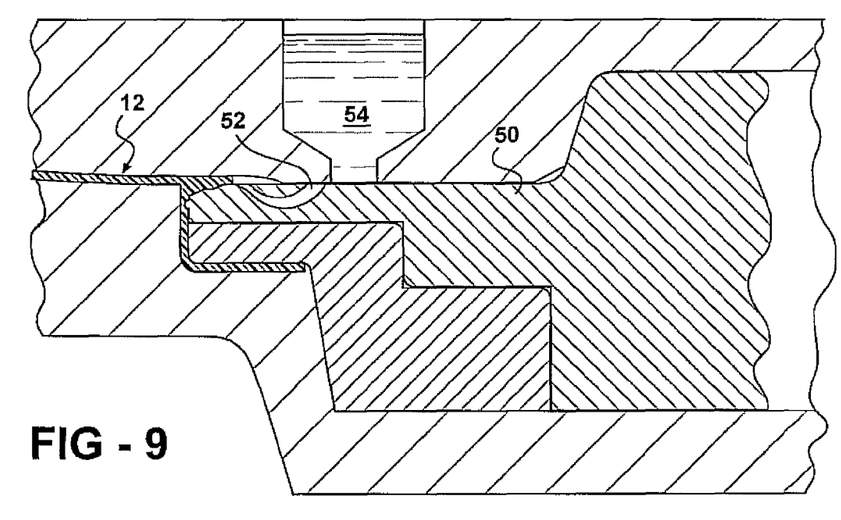
FIG. 9 is a schematic depiction of a first step in a molding process as being implemented to manufacture the cowl of FIG. 2.

FIG. 9 is a schematic depiction of a first step in a general, multi-shot molding process wherein articles comprising different polymeric materials in accord with the present invention may be fabricated. Such molding processes are generically referred to as retracting blade processes, since a retractable masking blade, slide or other such member is employed to control the flow of different molding materials into a mold cavity. As is shown in FIG. 9, a structural member of the component is formed in a first step by injection molding a high strength polymeric material into a mold cavity. FIG. 9 shows only a portion of the structural component, in this instance the window channel portion of the FIG. 2 embodiment, although it is to be understood that the entire structural member is molded in this first step. As will be seen, the molding apparatus includes a first slide member 50 which engages and defines a portion of the structural member. The structural member 12 is formed by injecting a first molten polymeric material into the mold cavity from a first injection port (not shown). As will be explained in detail below, the slide 50 will be moved in subsequent steps. The slide 50 includes a gate 52, termed a cashew gate, which provides a second injection port and which in subsequent steps will operate to deliver a second molding material to the system. This gate 52 is in communication with a source of elastomeric polymeric material 54, but in the FIG. 9 configuration it is in a forward position and not operable to deliver polymeric material thereto.

Figure 10:
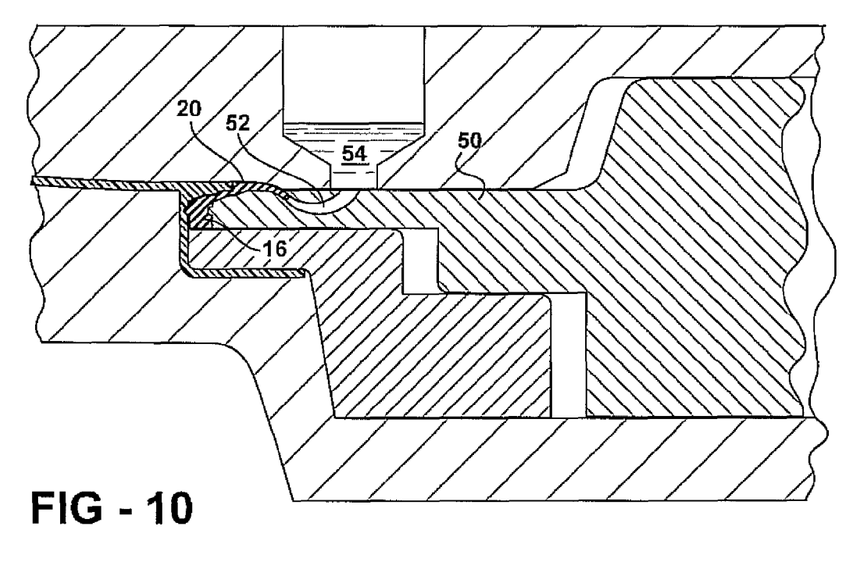
FIG. 10 is a depiction of the second step in the molding process of FIG. 9.

Referring now to FIG. 10, there is shown a subsequent step in the operation which is carried out after the injection of the material comprising the structural member 12. In this stage of the process, the slide 50 is withdrawn thereby defining a further mold cavity corresponding to the aforedescribed seals. By withdrawing slide 50, the injection gate 52 is placed in communication with the source of elastomeric polymer 54, and this material is then injected into the newly opened cavity so as to form the elastomeric portions of the cowl. The result of this process is that elastomeric polymer is fusion bonded to the high strength structural polymer thereby providing a composite component having structural integrity and integral sealing members.

Figure 11:
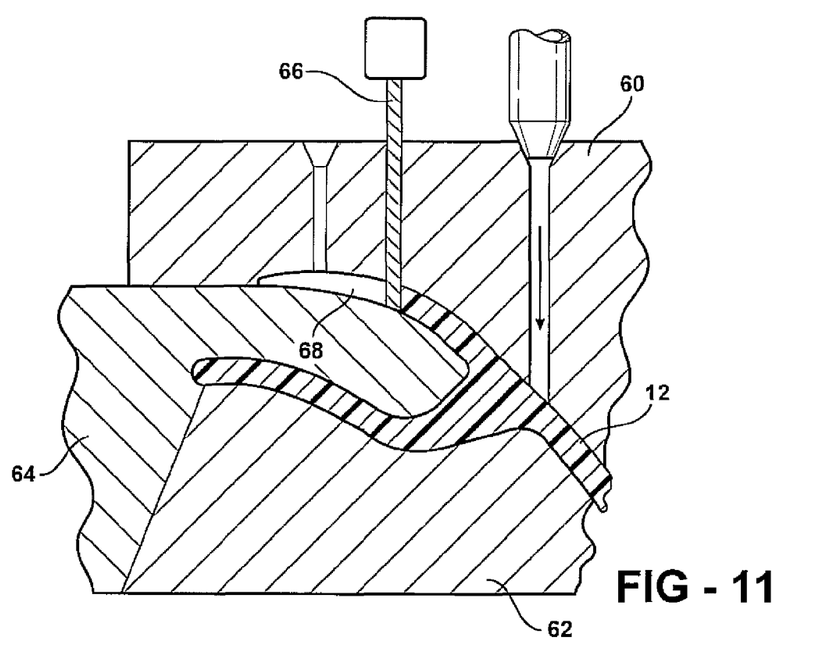
FIG. 11 is a schematic depiction of a retracting blade molding process as being implemented to manufacture the windshield sealing portion of the cowl of FIG. 3.
Figure 12:
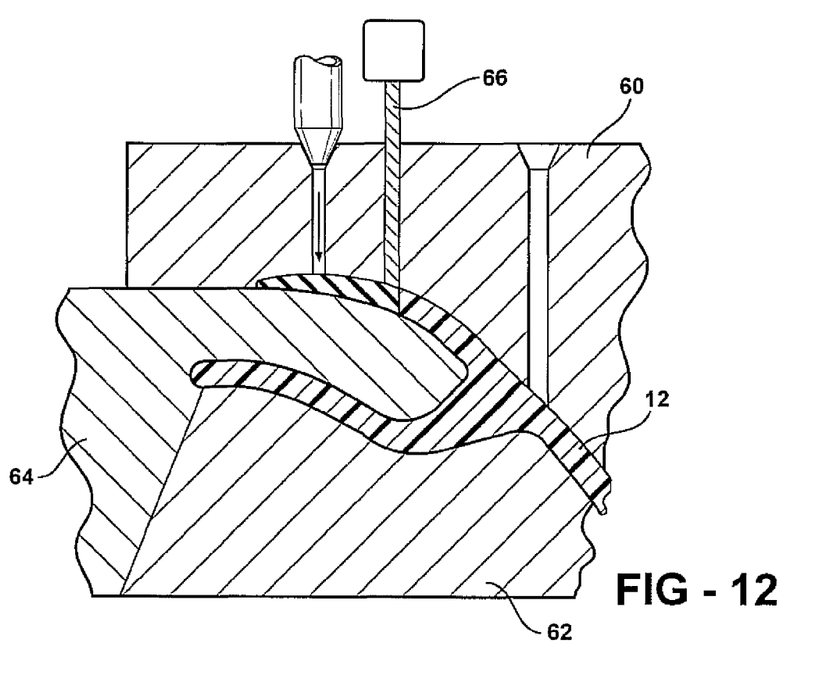
FIG. 12 is a depiction of the second stage in the molding process of FIG. 11.

Referring now to FIGS. 11 and 12, there is shown a composite molding process adopted for the manufacture of the FIG. 3 windshield seal portion of the cowl. As shown in FIG. 1, the molding apparatus is provided having a molded cavity defined by an upper mold element 60, a lower mold element 62; and in this embodiment, a core lifter 64 is also included to accommodate the molding of the hook portion of the cowl. The apparatus of FIG. 11 further includes a retracting blade 66 disposed so as to close off a portion of the mold cavity when disposed in its unretracted position. In a first step of the process, as is shown in FIG. 11, the structural member 12 is molded by injecting a high strength thermoplastic material into the mold cavity through injector 65. The presence of the retractable blade 66 prevents this first material from entering the seal-defining portion of the mold cavity 68. Following the injection of the first material, and is shown in FIG. 12, the blade 66 is withdrawn so as to open the seal portion of the cavity, and the second, elastomeric material is injected therein through injector 67, so as to form a resilient, fusion-bonded body with the first portion. After completion of the second step, the article is removed from the mold. Similar processes may be used to form other portions of the cowl. For example, the techniques described hereinabove can be used to form integral sealing gaskets for accommodating windshield wipers. Likewise, these techniques may be used to form plenum seals. While all the foregoing has described molding processes utilizing two different materials, one of which is a high strength structural polymer and the other is a resilient, elastomeric material, it is to be understood that the aforedescribed process may be extended to the manufacture of items having three or more different polymeric materials incorporated therein. For example, articles may be fabricated utilizing elastomeric materials of different durometer readings. Likewise, the structural portion of the component may be prepared from different materials for purposes of appearance, differential strength, and the like. For example, a structural core may be over molded with a surface coat to provide for paintability, appearance, or the like. Also, areas of the cowl requiring very high strength could be molded from very high strength polymers, while other portions requiring lesser strength could be molded from lower strength materials. All such embodiments are within the scope of this invention.

The foregoing represents some particular systems for fabricating the component of the present invention. Other molding systems, including transfer molding systems and rotational molding systems, as well as yet other systems operative to mold multimaterial articles, may be adapted for the practice of the present invention.

In view of the foregoing, it will be appreciated by one of skill in the art that yet other embodiments and modifications of the system may be implemented. Therefore, it is to be understood that the foregoing drawings, discussion and description are illustrative of particular embodiments of the invention, but are not meant to be limitations upon the practice thereof. It is the following claims, including all equivalents, which define the scope of the invention.

The invention claimed is:

1. A unitary cowl top ventilator component for a motor vehicle, said component comprising:
    a body of a rigid polymeric material defining a structural member of said component;
    a first body of an elastomeric polymer bonded to a first portion of the structural member, said first body of elastomeric material defining a first sealing member which is configured to engage a windshield; and
    a second body of an elastomeric polymer bonded to a second portion of the structural member so as to define a hood seal which is a hybrid blade seal, wherein said second portion of the structural member is a blade-like extension portion thereof, and said second body of an elastomeric polymer is a blade-like body which is fusion bonded to the blade-like extension portion, wherein said extension portion underlies a major portion of the second body of elastomeric polymer, so that when said hybrid blade seal engages said hood, the body of elastomeric polymer provides a tight environmental seal against the hood, and the underlying extension portion stiffens and supports the elastomeric polymer so as to prevent it from taking a set;
    said structural member further including a third portion configured to support a seal which engages a plenum of a motor vehicle.

2. The component of claim 1, wherein said seal which engages the plenum of the motor vehicle comprises a third body of an elastomeric polymer which is bonded to said third portion of said structural member.

3. The component of claim 1, wherein said first sealing member is configured as a flange which is operable to engage a portion of the face of a windshield proximate a portion of the perimeter thereof.

4. The component of claim 1, wherein the first sealing member is configured to engage an edge portion of a windshield.

5. The component of claim 1, wherein the first sealing member includes a primary sealing portion which engages an edge portion of a windshield and a secondary sealing portion which engages a portion of a face of the windshield.

6. The component of claim 1, wherein the rigid polymer is selected from the group consisting of nylon, ABS, polypropylene, TPO, ASA, PC and combinations thereof.

7. The component of claim 1, wherein said elastomeric polymer is selected from the group consisting of: synthetic rubber, natural rubber, copolymers, and combinations thereof.

8. The component of claim 1, wherein said body of rigid polymeric material further defines at least one attachment feature operative to engage a portion of a motor vehicle.

9. The component of claim 8, wherein said attachment feature comprises a hook which is configured to engage a windshield.

10. The component of claim 1, wherein said component is manufactured by an injection molding process.

11. A unitary cowl top ventilator component for a motor vehicle, said component comprising:
    a body of a rigid polymeric material defining a structural member of said component;
    a first body of an elastomeric polymer bonded to a first portion of the structural member, said first body of elastomeric material defining a first sealing member which is configured to engage a windshield; and
    a second body of elastomeric material bonded to a second portion of the structural member so as to define a hood seal which is a generally elongated member having opposing edges bonded to the structural member and a central portion therebetween which projects from said structural member, said central portion defining a bulb seal which is configured to engage a hood of a motor vehicle.

12. The component of claim 11, wherein said structural member includes a slot and the opposing edges of said second body of elastomeric material are bonded to opposing edges of said slot.

13. The component of claim 12, wherein said slot includes at least one bridging portion extending thereacross.

14. A unitary cowl top ventilator component for a motor vehicle, said component comprising:
    a body of a rigid polymeric material defining a structural member of said component;
    a first body of an elastomeric polymer bonded to a first portion of the structural member, said first body of elastomeric material defining a first sealing member which is configured to engage an edge portion of a windshield; and
    a second body of an elastomeric polymer bonded to a second portion of the structural member so as to define a hood seal which is a hybrid blade seal, wherein said second portion of the structural member is a blade-like extension portion thereof, and said second body of an elastomeric polymer is a blade-like body which is fusion bonded to the blade-like extension portion, wherein said extension portion underlies a major portion of the second body of elastomeric polymer, so that when said hybrid blade seal engages said hood, the body of elastomeric polymer provides a tight environmental seal against the hood, and the underlying extension portion stiffens and supports the elastomeric polymer so as to prevent it from taking a set.

15. The component of claim 14, wherein the first sealing member includes a primary sealing portion which engages said edge portion of said windshield and a secondary sealing portion which engages a portion of a face of the windshield.

* * * * *